(12) United States Patent
Capek

(10) Patent No.: US 11,459,031 B1
(45) Date of Patent: Oct. 4, 2022

(54) TWO SEGMENT THREE WHEEL VEHICLE

(71) Applicant: Michael J. Capek, Richmond Heights, OH (US)

(72) Inventor: Michael J. Capek, Richmond Heights, OH (US)

( * ) Notice: Subject to any disclaimer, the term of this patent is extended or adjusted under 35 U.S.C. 154(b) by 0 days.

(21) Appl. No.: 17/200,843

(22) Filed: Mar. 14, 2021

(51) Int. Cl.
*B62D 9/02* (2006.01)
*B60G 9/04* (2006.01)

(52) U.S. Cl.
CPC ............... *B62D 9/02* (2013.01); *B60G 9/04* (2013.01); *B60G 2300/45* (2013.01)

(58) Field of Classification Search
CPC ........ B62K 5/05; B60G 9/04; B60G 2300/45; B62D 9/02
See application file for complete search history.

(56) References Cited

U.S. PATENT DOCUMENTS

| | | | | |
|---|---|---|---|---|
| 4,572,535 | A * | 2/1986 | Stewart | B62K 3/005 280/266 |
| 7,568,541 | B2 * | 8/2009 | Pfeil | B60G 21/007 180/210 |
| 7,648,148 | B1 * | 1/2010 | Mercier | B62K 5/027 280/124.103 |
| 9,650,099 | B2 * | 5/2017 | Hall | B62M 9/04 |
| 10,723,381 | B2 * | 7/2020 | Thompson | B62D 23/005 |
| 2009/0224524 | A1 * | 9/2009 | Rathsack | B62K 3/005 280/778 |
| 2013/0105238 | A1 * | 5/2013 | Hall | B62J 35/00 180/210 |
| 2014/0019006 | A1 * | 1/2014 | Bruce | B60W 10/20 701/41 |
| 2017/0233022 | A1 * | 8/2017 | Marko | B62D 5/0442 180/210 |
| 2018/0229796 | A1 * | 8/2018 | Chojecki | B62K 5/08 |

FOREIGN PATENT DOCUMENTS

| | | | | |
|---|---|---|---|---|
| CN | 103171389 | A * | 6/2013 | ............... B62K 5/05 |
| DE | 102012107154 | A1 * | 2/2014 | ............... B62D 9/02 |
| DE | 102018123163 | A1 * | 4/2019 | ........... B60G 99/002 |
| KR | 20210020528 | A * | 2/2021 | |
| WO | WO-2014022315 | A2 * | 2/2014 | ............... B62D 9/02 |
| WO | WO-2017013178 | A1 * | 1/2017 | ............. B62D 12/00 |
| WO | WO-2019123205 | A1 * | 6/2019 | ............... B62K 5/10 |
| WO | WO-2021145351 | A * | 7/2021 | |

* cited by examiner

*Primary Examiner* — James A English
*Assistant Examiner* — Maxwell L Meshaka
(74) *Attorney, Agent, or Firm* — Daniel M. Cohn; Howard M. Cohn

(57) ABSTRACT

The present invention relates generally to motorized vehicles and more specifically to a three wheeled motorized vehicle providing a hybrid crossover between an automobile and a motorcycle that is able to take tight corners like a motorcycle by provision of a segment enclosing the operator that can lean into turns, The front segment contains two wheels for both steering and propulsion and is conventionally constructed like any typical front wheel drive vehicle. The rear segment contains the operator (and optionally passenger) supported on a single wheel, The two segments are joined together via a coupling that both supports the assembly and allows rotation of the rear segment about the longitudinal axis to perform the lean for operator and or passenger comfort, while transmitting critical control functions.

19 Claims, 5 Drawing Sheets

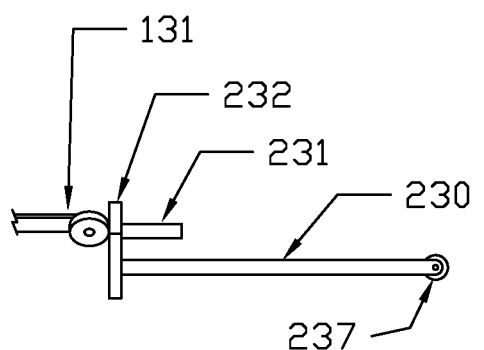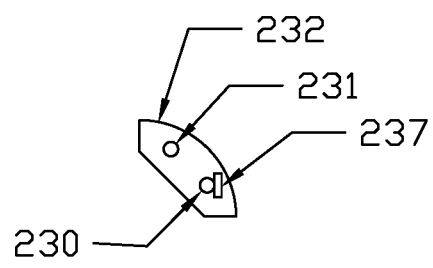
FIG. 10   FIG. 11
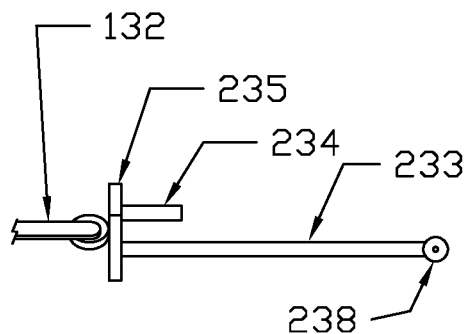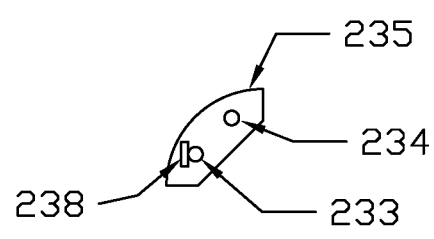
FIG. 12   FIG. 13

TWO SEGMENT THREE WHEEL VEHICLE

FIELD OF INVENTION

The present invention relates generally to motorized vehicles and more specifically to a three wheeled motorized vehicle providing a hybrid crossover between an automobile and a motorcycle that allows the operator to lean into turns. This is accomplished by assembling the vehicle with two segments. The front segment contains a power plant and two wheels for both steering and propulsion and is constructed similarly to the front of any typical front wheel drive vehicle. The rear segment contains the operator (and optionally a passenger) supported on a single non-driven wheel. The two segments are joined together by a coupling that both supports the assembly and allows rotation of the rear segment about the longitudinal axis to allow the operator (and passenger) to lean into turns. This feature improves the comfort of the driver and passenger but also shifts the center of gravity to allow tighter turns. The control of this rotation can be turned on or off, and could be manual or automatic, based on speed and the turn radius.

BACKGROUND

Embodiments described herein relate to three-wheeled motor vehicles and more specifically, the embodiments described herein relate to reverse-trike vehicles.

In an effort to reduce both the cost of operation and global warming, it is desirable to reduce energy consumption of automotive vehicles. Accordingly, the size and weight of some vehicles have been reduced to improve fuel efficiency.

Another major factor in energy consumption is the wind resistance of the vehicle.

Additionally, of the roughly 150 million people who work in the United States, over 110 million commute individually (not carpooling). Use of a one- or two-passenger vehicle designed for minimal energy use while commuting to work or school could significantly reduce overall energy usage.

One alternative to traditional four-wheeled vehicles is a motorcycle. Known motorcycles are inherently more efficient than four-wheeled vehicles although less safe and only truly useful in warmer weather or climates.

The improved efficiency results from both reduced weight of the vehicle and the smaller area of wind resistance that a single rider creates compared to a typical automotive windshield.

The goal of combining the desirable features of both four-wheeled vehicles and motorcycles has led to the development of three-wheeled vehicles. One known configuration of a three-wheeled vehicle includes two wheels at the front of the vehicle and one wheel at the rear of the vehicle, commonly referred to as a "reverse trike".

Many of the known three-wheeled vehicles utilize a straddle seating arrangement similar to a motorcycle that exposes the driver to the weather.

There are other three wheel vehicles. While these vehicles may be suitable for the purposes for which they were designed, they would not be as suitable for the purposes of the present invention as heretofore described.

Exemplifying the prior art is U.S. Pat. No. 10,723,381 B2 (Thompson: TRIKE VEHICLE WITH SELECTIVITY PIVOTABLE OPERATOR CABIN) which has a similar goal but with an opposite design strategy.

Additionally is U.S. Pat. No. 9,650,099 B2 (Hall, et al; SYSTEMS AND APPARATUS FOR A THREE-WHEELED VEHICLE) also with a similar goal but opposite design strategy.

It is thus desirable to provide a hybrid crossover between an automobile and a motorcycle that is able to take tight corners almost like a motorcycle but is driven and handled like an automobile by optionally leaning into turns, while borrowing as much as possible from existing vehicle designs.

SUMMARY OF THE PRESENT INVENTION

The present invention provides a hybrid crossover between an automobile and a motorcycle that is able to take tight corners like a motorcycle by optionally leaning into turns but is driven and handled like an automobile.

The vehicle is designed with a conventional front segment is similar to the front half of many front wheel drive vehicles in use today in that it includes the power plant (gas powered engine; electric motor, or hybrid), two front wheels that provide both propulsion and steering, and headlights, signaling lights, and other support systems. It differs in that it also includes either fuel storage or a (electric vehicle) battery and also houses the coupling required to support and tilt the rear segment. It may optionally include a small storage area. The rear segment contains the cockpit for the operator (and optionally a passenger), as well as all the typical accoutrements (air conditioning, radio, etc), one rear wheel, and necessary lights for indication of turning or braking. Heating of the cockpit would be electric.

These two segments are joined via a unique coupling that allows the rear segment to rotate about the longitudinal axis of the assembly while also transmitting steering, acceleration, braking, and basic signaling through the coupling. Control of the transmission is by wire.

Power Plant

The front segment that includes the power plant will closely resemble any small front wheel drive vehicle in use today; either gas or electric powered, except the fuel storage or battery will also be in the front segment. Tires would be conventional automobile tires selected for the vehicle front segment.

Cockpit

The rear segment will optionally tilt the driver (and passenger) when making turns or changing lanes. The driver may turn this feature on or off. The compartment may optionally be elongated to include a passenger seat behind the driver, but inline along the longitudinal axis of the vehicle. The narrow cockpit design will reduce wind drag compared to vehicles positioning the passenger beside the driver. Doors may be provided both left and right for ease of entry or may be removable to provide a more open sensation for the occupants. Conventional automobile seats with seat belts provide improved comfort and safety compared with a motorcycle. The single rear wheel will be non-driven and utilize a tire similar to a motorcycle. It will still have a brake.

Control of the cockpit tilt angle will be through servo control of the cockpit support cylinder either through manual or automatic control based on speed and turn radius. Automatic control methods employed for the purpose of controlling vehicle tilt angle are already described in other patents.

Depicted in the drawings is tilt control accomplished with an actuator driven by a servo motor, but tilt control could be performed with a hydraulic actuator, worm gear driven cylinder, or other methods.

Control of the transmission is by wire. Control of acceleration and braking could also be by wire but is presented here as a conventional preference.

BRIEF DESCRIPTION OF THE DRAWING FIGURES

The foregoing and other features of the invention will become more apparent upon a consideration of the following description taken in connection with the accompanying figures. The figures are intended to be illustrative, not limiting.

Certain elements in some of the figures may be omitted, or illustrated not-to-scale, for illustrative clarity. The cross-sectional views may be in the form of slices, or near-sighted cross-sectional views, omitting certain background lines which would otherwise be visible in a true cross-sectional view, for illustrative clarity.

FIG. 10 is a side view of the accelerator push plate assembly.

FIG. 11 is an end view of the accelerator push plate assembly.

FIG. 12 is a side view of the brake push plate assembly.

FIG. 13 is an end view of the brake push plate assembly.

DESCRIPTION OF THE REFERENCED NUMERALS

Figure 1:
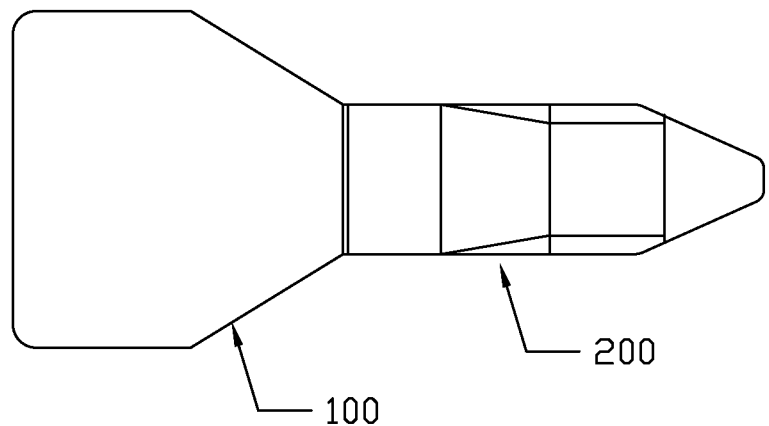
FIG. 1 is a top view of the vehicle of the present invention.

With regard to the reference numerals used, the following numbering is used consistently throughout the various drawing figures, although not all components appear in all figures.
100 front segment
111 front wheel
120 rear segment support cylinder front bearing
121 rear segment support cylinder rear bearing
122 rear segment tilt control arm
123 rear segment tilt control linear actuator
124 rear segment tilt control servo motor
125 attachment bolt
131 accelerator operator
132 brake operator
140 flexible brake line
150 flexible air conditioning supply line
151 flexible air conditioning return line
160 flexible wiring harnesses
200 rear segment
211 rear wheel
212 rear wheel support arm
213 rear strut
214 rear strut positioning arm
215 rear strut linear actuator
220 rear segment support cylinder
221 steering column
222 steering column u-joint coupling
223 intermediate steering shaft
224 front inter mediate steering shaft bearing
225 rear intermediate steering shaft bearing
226 steeling shaft u-joint coupling
227 rear segment support cylinder front wall
228 rear segment support cylinder rear wall
230 accelerator push rod
231 accelerator guide rod
232 accelerator push plate
233 brake push rod
234 brake guide rod
235 brake push plate
236 bushing for rods
237 accelerator push roller
238 brake push roller
240 fixed brake line
241 brake pedal
250 fixed air conditioning supply line
251 fixed air conditioning return line
260 fixed wiring harness

DETAILED DESCRIPTION OF THE PREFERRED EMBODIMENT

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

Referring to FIG. 1, there is illustrated a simple overhead view of the two segment three wheel vehicle—the front segment 100 and the rear segment 200.

Figure 2:
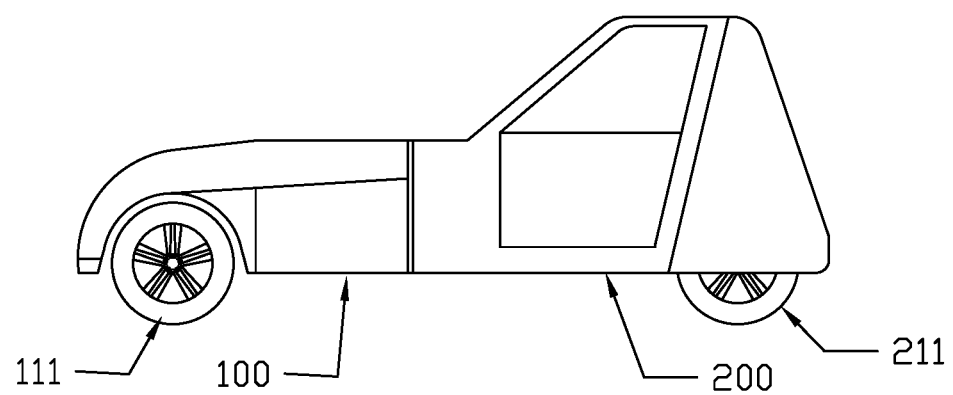
FIG. 2 is a side view of the vehicle of the present invention.

FIG. 2 provides a side view of the two segment three wheel vehicle. The left front wheel 111 is shown under the front segment 100 and the rear wheel 211 is shown under the rear segment 200. Throughout the figures, components starting with the numeral 1 (100, 111, 120, etc.) are typically associated with the front segment. Components starting with the numeral 2 (200, 211, 21.2, etc) are typically associated with the rear segment.

Figure 3:
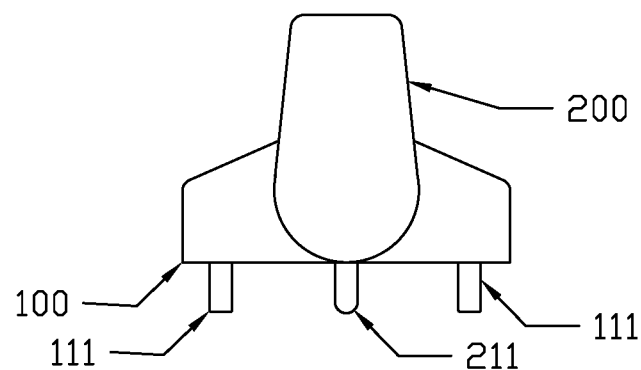
FIG. 3 is a rear view of the vehicle of the present invention as the vehicle is being driven straight ahead.

FIG. 3 provides a rear view of the two segment three wheel vehicle as the vehicle is being driven straight ahead. In this view, the single rear wheel 211 is at its normal position. Both front wheels 111 are headed straight.

Figure 4:
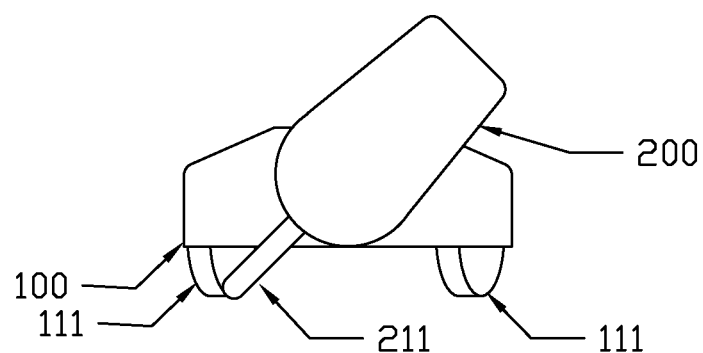
FIG. 4 is a rear view of the vehicle of the present invention as the vehicle is being driven in a hard right turn

FIG. 4 is a rear view of the vehicle of the present invention as the vehicle is being driven in a hard right turn. In this view, the rear segment 200 is tilted about 45 degrees and the single rear wheel 211 is extended so as to maintain the driver in a level position with respect to the surface being driven on. Both front wheels 111 are turned to the right.

Figure 5:
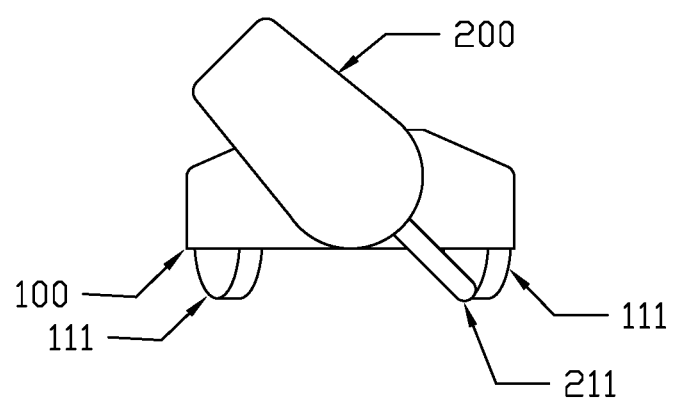
FIG. 5 is a rear view of the vehicle of the present invention as the vehicle is being driven in a hard left turn.

FIG. 5 is a rear view of the vehicle of the present invention as the vehicle is being driven in a hard left turn. In this view, the rear segment 200 it tilted about −45 degrees and the single rear wheel 211 is extended so as to maintain the driver in a level position with respect to the surface being driven on. Both front wheels 111 are turned to the left.

Figure 6:
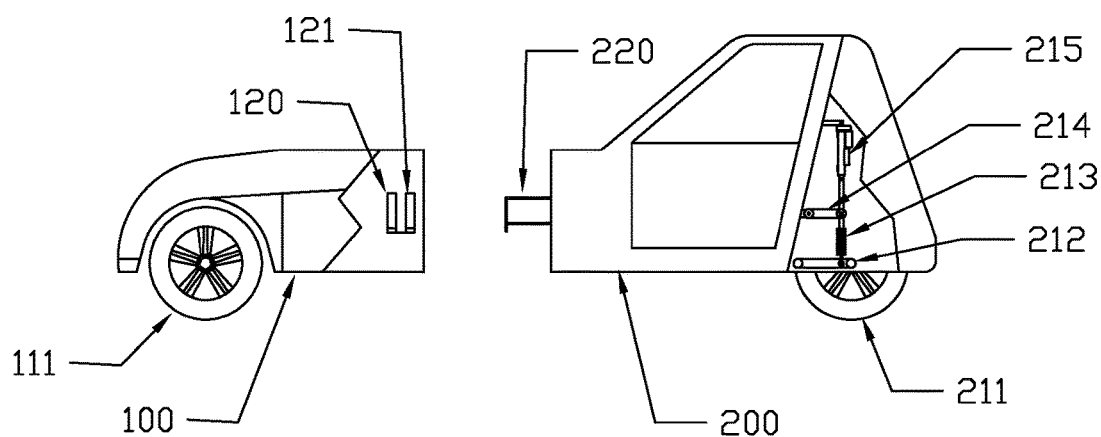
FIG. 6 is an illustrative side view of the present invention showing the two segments with a cutaway view on each exposing critical components.

FIG. 6 is an illustrative side view of the present invention showing the two segments with a cutaway view on each exposing critical components. Bearings 120 and 121 are mounted within the front segment 100. The exact style of mounting (pillow block, flange mount, etc.) is dependent on the front segment design and is not shown. Cylinder 220 is fixed to the rear segment 200 and both supports and allows rotation of the rear segment. As the rear segment tilts, the linear actuator 215 is used to extend the rear wheel 211 through repositioning of the rear strut 213. Arm 214 aids positioning of the rear strut. The extension of the rear wheel 211 allows the vehicle to maintain attitude while tilting.

Figure 7:
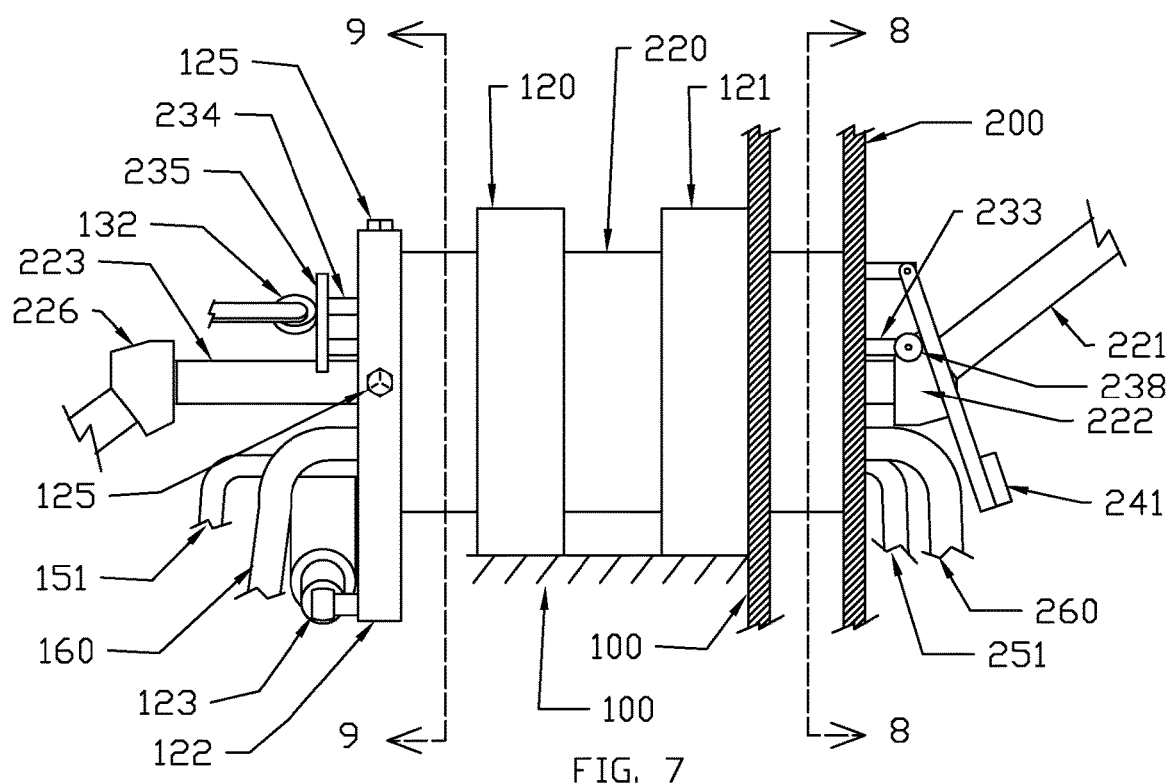
FIG. 7 is a detailed side view of the coupling which couples the two segments together.

FIG. 7 is a detailed side view of the coupling which couples the two vehicle segments together. Rear segment support cylinder 220 is fixed to the rear segment 200 and can be caused to rotate within bearings 120 and 121 by linear actuator 123 acting through the rear segment tilt control arm 122, which is attached to the cylinder with three attachment bolts 125. This rotation thus causes the rear segment to tilt. Steering of the vehicle is accomplished by the steering column 221 acting through the steering column u-joint coupling 222, the intermediate steering shaft 223, and finally the steering shaft u-joint coupling 226, which in turn connects to the steering box of the vehicle. This coupling may not be required depending on the vehicle design and steering box location. Braking of the vehicle is accomplished by depressing the brake pedal 241 which in turn pushes on the brake push rod 233 through brake push roller 238. The brake push rod 233 transmits the braking force to the brake push plate 235, which in turn transmits the force to the brake operator 132, connected to the conventional master brake cylinder. Brake guide rod 234, also attached to the brake push plate 235, prevents rotation of the brake push plate 235. As the cylinder 220 and rear segment 200 rotate, it is necessary that the flexible wiring harness 160, flexible brake line 140, flexible air conditioning supply line 150, and flexible air conditioning return line 151, all in the front segment, are flexible. In the rear segment 200, the fixed wiring harness 260, the fixed brake line 240, the fixed air conditioning supply line 250, and the fixed air conditioning return line 251, are all fixed and routed conventionally. Control of the transmission is by wire. Control of acceleration and braking could also be by wire but are presented here as a conventional preference. While the various lines 160, 140, 150, 151, 260, 240, 250, and 251 are angled down for clarity, their exact routing is unimportant and dependent on vehicle design.

Figure 8:
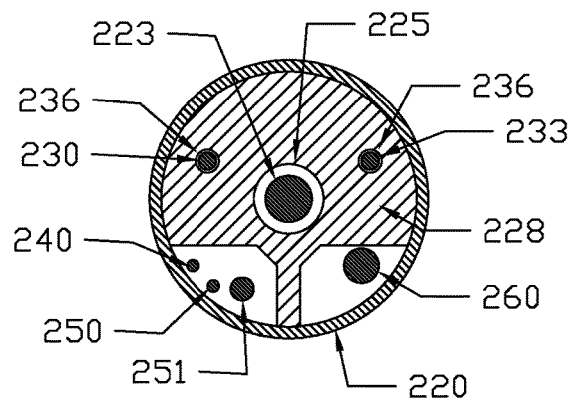
FIG. 8 is a section view of the coupling facing the rear segment.

FIG. 8 is a section view of the coupling depicted in FIG. 7 facing the rear segment. Rear segment support cylinder 220 has partially closed rear wall 228 that provides support for the intermediate steering shaft 223 through rear bearing 225 and support for the brake push rod 233 and the accelerator push rod 230 with rod bushings 236. Open areas in the lower portion of the cylinder rear wall 228 allow passage of the fixed wiring harness 260, the fixed brake line 240, the fixed air conditioning supply line 250, and the fixed air conditioning return line 251.

Figure 9:
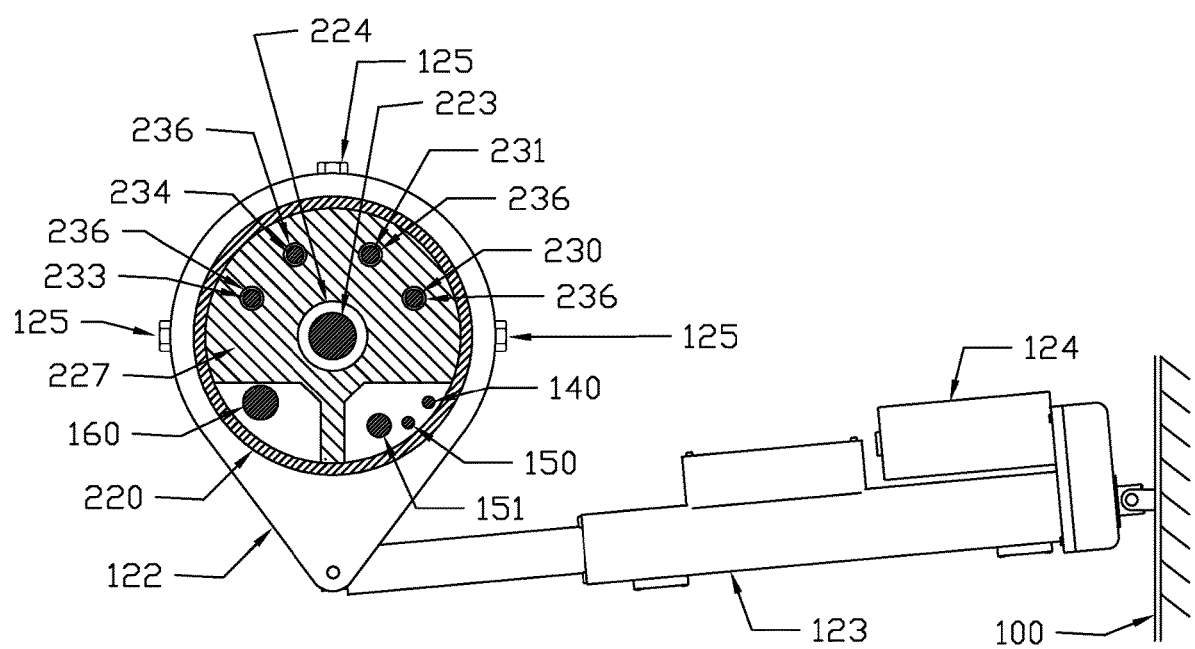
FIG. 9 is a section view of the coupling facing the front segment.

FIG. 9 is a section view of the coupling depicted in FIG. 7 facing the front segment. Rear segment support cylinder 220 has a partially closed front wall 227 that provides support for the intermediate steering shaft 223 through front bearing 224 and support for the brake push rod 233 and the accelerator push rod 230 with rod bushings 236. The accelerator guide rod 231 and the brake guide rod 234 also pass through this end of the rear segment support cylinder 220 and are supported by bushings 236. The guide rods prevent rotation of the push plates. Open areas in the lower portion of the front wall 227 allow passage of the flexible wiring harness 160, the flexible brake line 140, the flexible air conditioning supply line 150, and the flexible air conditioning return line 151.

FIG. 10 is a side view of the accelerator push plate assembly. As the operator depresses the accelerator pedal (not shown), it presses against the accelerator push roller 237 which transmits the force through the accelerator push rod 230 to the accelerator push plate 232 and subsequently to accelerator operator 131. As shown, the accelerator operator 131 is positioned at 45 degrees from vertical, in the midpoint of rotation of the accelerator push plate 232. Accelerator guide rod 231 prevents rotation of the accelerator push plate 232 about the axis of the accelerator push rod 230. Accelerator operator 131 is attached to the conventional accelerator linkage. Exact detail is dependent on vehicle design.

FIG. 11 is an end view of the accelerator push plate assembly. The entire assembly shown in this view rotates with the rear segment 200 whenever the vehicle is tilting. As shown, the accelerator push plate 232 would allow tilt angles of approximately plus or minus 45 degrees, while still providing positive contact with the accelerator operator 131 shown in FIG. 10.

FIG. 12. Is a side view of the brake push plate assembly. As the operator depresses the brake pedal (not shown), it presses against the brake push roller 238 which transmits the force through the brake push rod 233 to the brake push plate 235 and subsequently to brake operator 132. Brake guide rod 234 prevents rotation of the brake push plate 235 about the axis of the brake push rod 233. Brake operator 132 is attached to the conventional brake cylinder or intermediate linkage, depending on vehicle design.

FIG. 13 is an end view of the brake push plate assembly. The entire assembly shown in this view rotates with the rear segment 200 whenever the vehicle is tilting. As shown, the brake push plate 235 would allow tilt angles of approximately plus or minus 45 degrees, while still providing positive contact with the brake roller 132 shown in the FIG. 12.

Having described the invention, the following is claimed:

1. A two segment three wheeled vehicle comprised of:
    a. a front segment containing a power plant, and two steering drive wheels;
    b. a rear segment supported by a single, non-driven wheel and a support cylinder, the rear segment containing a cockpit to house a driver and controls of the vehicle;
    c. a coupling that connects the front and rear segments together, and provides the ability for the rear segment to rotate about a longitudinal axis of the vehicle and to lean into turns, and conducts controls from the rear segment to the front segment as well as support systems from the front segment to the rear segment;
    d. a cylinder fixed to the rear segment to rotate within bearings mounted within the front segment, the cylinder rotatable by a linear actuator attached thereto; and
    e. the linear actuator extending the rear wheel by repositioning a rear strut aided by an arm whereby the extension of a rear wheel allows the vehicle to maintain the driver in a level position with respect to a surface being driven on.

2. The two segment, three wheeled vehicle of claim 1, wherein the rear segment has an angular tilting to lean into turns +/−45°, for total angular travel of 90° about the longitudinal axis of the vehicle.

3. The two segment three wheeled vehicle of claim 2, further comprising the coupling that connects the front and rear segments together allows tilting between the front and rear segments while also transmitting controls between the front and rear segments.

4. The two segment three wheeled vehicle of claim 3, wherein the rear segment will tilt the driver when making turns or changing lanes.

5. The two segment three wheeled vehicle of claim 3, further comprising the vehicle being gas powered.

6. The two segment three wheeled vehicle of claim 5, wherein a fuel storage tank is in the front segment.

7. The two segment three wheeled vehicle of claim 3, further comprising the vehicle being electric powered.

8. The two segment three wheeled vehicle of claim 7, wherein electric power is a battery in the front segment.

9. The two segment three wheeled vehicle of claim 4, wherein the rear segment includes a cockpit including a passenger seat disposed behind the driver inline along the longitudinal axis of the vehicle.

10. The two segment three wheeled vehicle of claim 4, wherein a wiring harness, a brake hose, an air conditioning supply hose, and an air conditioning return hose are all in the front segment and are flexible.

11. The two segment three wheeled vehicle of claim 10, wherein the wiring harness, a brake line, an air conditioning supply, and an air conditioning return are all fixed and in the rear segment.

12. A two segment, three wheeled vehicle comprised of:
a front segment containing a power plant, and two steering drive wheels;
a rear segment supported by a single, non-driven wheel and a support cylinder, the rear segment containing a cockpit to house a driver and controls of the vehicle;
a coupling that connects the front and rear segments together, and provides the ability for the rear segment to rotate about a longitudinal axis of the vehicle and to lean into turns, and conducts controls from the rear segment to the front segment as well as support systems from the front segment to the rear segment;
a cylinder fixed to the rear segment to rotate within bearings mounted within the front segment, the cylinder rotatable by a linear actuator attached thereto; and
the linear actuator extending the rear wheel by repositioning a rear strut aided by an arm whereby the extension of a rear wheel allows the vehicle to maintain the driver in a level position with respect to a surface being driven on.

13. The two segment three wheeled vehicle of claim 12, further comprising the coupling allowing tilting between the front and rear segments while also transmitting controls between the front and rear segments.

14. The two segment three wheeled vehicle of claim 13, wherein the rear segment will tilt the driver when making turns or changing lanes.

15. The two segment three wheeled vehicle of claim 14, further comprising the vehicle being gas powered and a fuel storage tank is in the front segment.

16. The two segment three wheeled vehicle of claim 14, further comprising the vehicle being electric powered and the electric power being provided by a battery in the front segment.

17. The two segment three wheeled vehicle of claim 14, wherein the rear segment includes a cockpit including a passenger seat disposed behind the driver inline along the longitudinal axis of the vehicle.

18. The two segment, three wheeled vehicle of claim 14, wherein the rear segment has an angular tilting of +/−45°, for total angular travel of 90° about the longitudinal axis through the vehicle.

19. The two segment three wheeled vehicle of claim 14, wherein a wiring harness, a brake hose, an air conditioning supply hose, and an air conditioning return hose are all in the front segment and are flexible and a wiring harness, a brake line, an air conditioning supply, and an air conditioning return are all fixed and in the rear segment.

* * * * *